United States Patent [19]

Cameron

[11] Patent Number: 4,689,753
[45] Date of Patent: Aug. 25, 1987

[54] CALCULATOR FOR CHEMICAL STOICHIOMETRY

[76] Inventor: David L. Cameron, P.O. Box 10616, Westside Sta., Daytona Beach, Fla. 32020

[21] Appl. No.: 744,026

[22] Filed: Jun. 12, 1985

[51] Int. Cl.$^4$ .................... G06F 15/20; G06F 15/32
[52] U.S. Cl. .................... 364/496; 364/709; 364/715
[58] Field of Search ............. 364/496, 709, 710, 715, 364/200 MS File, 900 MS File; 235/310

[56] References Cited

U.S. PATENT DOCUMENTS

| | | | |
|---|---|---|---|
| 3,911,424 | 10/1975 | Giannuzzi et al. | 364/709 |
| 3,979,057 | 9/1976 | Katz et al. | 364/706 |
| 4,001,569 | 1/1977 | Dickinson et al. | 364/716 |
| 4,060,719 | 11/1977 | Dalinowski | 364/729 |
| 4,092,523 | 5/1978 | Tava et al. | 364/709 |
| 4,092,527 | 5/1978 | Luecke | 364/709 |
| 4,100,602 | 4/1978 | Shapiro | 364/715 |
| 4,319,130 | 3/1982 | Spitznen | 364/709 |
| 4,334,278 | 6/1982 | Marmon | 364/715 |

OTHER PUBLICATIONS

Conklin, David, Hewlett-Packard Users Library Program Number 326 C, Molecular Weight Calculator.
Manning, Christopher, Hewlett-Packard Users Library Program Number 2336C, Molecular Mass Calculator.

Primary Examiner—Errol A. Krass
Assistant Examiner—Daniel W. Juffernbruch

[57] ABSTRACT

An electronic calculator having unique utility for computation in chemical stoichiometry is described. Push-bottom input keys for stoichiometry are labeled by chemical unit, each of said keys being juxtaposed to an LED indicator light, and said keys being apportioned by line segments on the keyboard into five functional groups. The stoichiometry keys utilize variable conversion factors input by the user to automatically effect arithmetic conversion of a number, input with its chemical unit, into the equivalent number having a different chemical unit, said units being implicitly displayed by illumination of appropriate LED's. For students and others, the invention greatly simplifies the task of computation in chemical stoichiometry.

6 Claims, 8 Drawing Figures

CALCULATOR FOR CHEMICAL STOICHIOMETRY

The current invention comprises the application to chemical stoichiometry of unit-converting calculators using variable, user-input conversion factors and having unit display means, said calculators being first described in patent application Ser. Nos. 465,279; 604,956; and 604,957, now abandoned.

BACKGROUND OF THE INVENTION

Rapid advances in electronics have resulted in production of electronic calculators having impressive computational capabilities. Arithmetically powerful calculators have proven their general utility, but are not well suited to certain computational needs of some groups of calculator users. In recognition of needs not met by general purpose calculators, many special purpose calculators (for example, a calculator designed to help shoppers select best shopping value, Marmon—U.S. Pat. No. 4,334,278) have been developed. The invention described herein is intended to meet the need of students, technicians, chemists, and others for a computational device that facilitates calculations in chemical stoichiometry.

The computational method most appropriate to chemical stoichiometry is called "dimensional analysis", comprising a sequence of multiplications by unit conversion factors such that, in stoichiometry, a number having a given chemical unit is converted to an equivalent number having a different chemical unit. A similar non-chemical problem, using numerically invariable conversion factors, would be calculating the number of nanometers equal to one mile:

$$x \text{ nm} = 1 \text{ mi} \left( \frac{5280 \text{ ft}}{1 \text{ mi}} \right) \left( \frac{1 \text{ meter}}{3.28 \text{ ft}} \right) \left( \frac{1,000,000,000 \text{ nm}}{1 \text{ meter}} \right)$$

Many calculators do perform similar unit conversions using a singal, invariable conversion factor. Such calculators cannot simplify computation in chemical stoichiometry as they are not designed to facilitate step-wise unit conversions using variable, user-input conversion factors. The electronic device described herein performs common arithmetic operations, and specifically utilizes chemical units input by the user to automatically effect stoichiometric conversions, thereby greatly facilitating computations for students and others.

SUMMARY OF THE INVENTION

The over-all objective of the invention is to provide an electronic calculating device which has, in addition to the ability to perform selected arithmetic opertions, the ability to utilize variable, step-wise user input to automatically effect the arithmetic conversion of a number having a given chemical unit into an equivalent number in terms of a different chemical unit, thereby facilitating unit conversions in chemical stoichiometry.

An additional object is to provide an electronic calculating device compatible with the dimensional analysis method of computation in chemical stoichiometry, said device implementing appropriate arithmetic operations directed by actuation of pairs of input switches labeled by chemical unit, and said device having means for explicit or implicit display of said chemical units.

A further object is to provide an electronic calculating device to facilitate computation in chemical stoichiometry by providing sequence guidance to the user for input variable, step-wise chemical conversion factors.

These and additional implied objects are achieved by the current invention, the embodiment described herein comprising: an electronic calculator having numerical display means and a keyboard of push-button input keys, said input keys to direct arithmetic operations for chemical stoichiometry being labeled by chemical unit, and being apportioned to separat4e functional groups by line segments on the keyboard; and, each of said unit-labeled input keys being juxtaposed to a miniature LED indicator light, illumination of a given LED providing implicit display of the chemical unit on the juxtaposed input key. The user will utilize the unit-labeled input keys to enter a sequence of chemical units, with variable corresponding numerical values, in a step-wise manner, said sequence being guided by line segments on the keyboard. If an error is made in the sequence in which the unit-labeled input keys are used, an appropriately labeled LED indicator light will be illuminated.

BRIEF DESCRIPTION OF THE DRAWINGS

To illustrate and explain the invention, there are shown in the drawings forms which are generally preferred, it being understood, however, that this invention is not limited to the precise forms shown.

DETAILED DESCRIPTION

Figure 1:
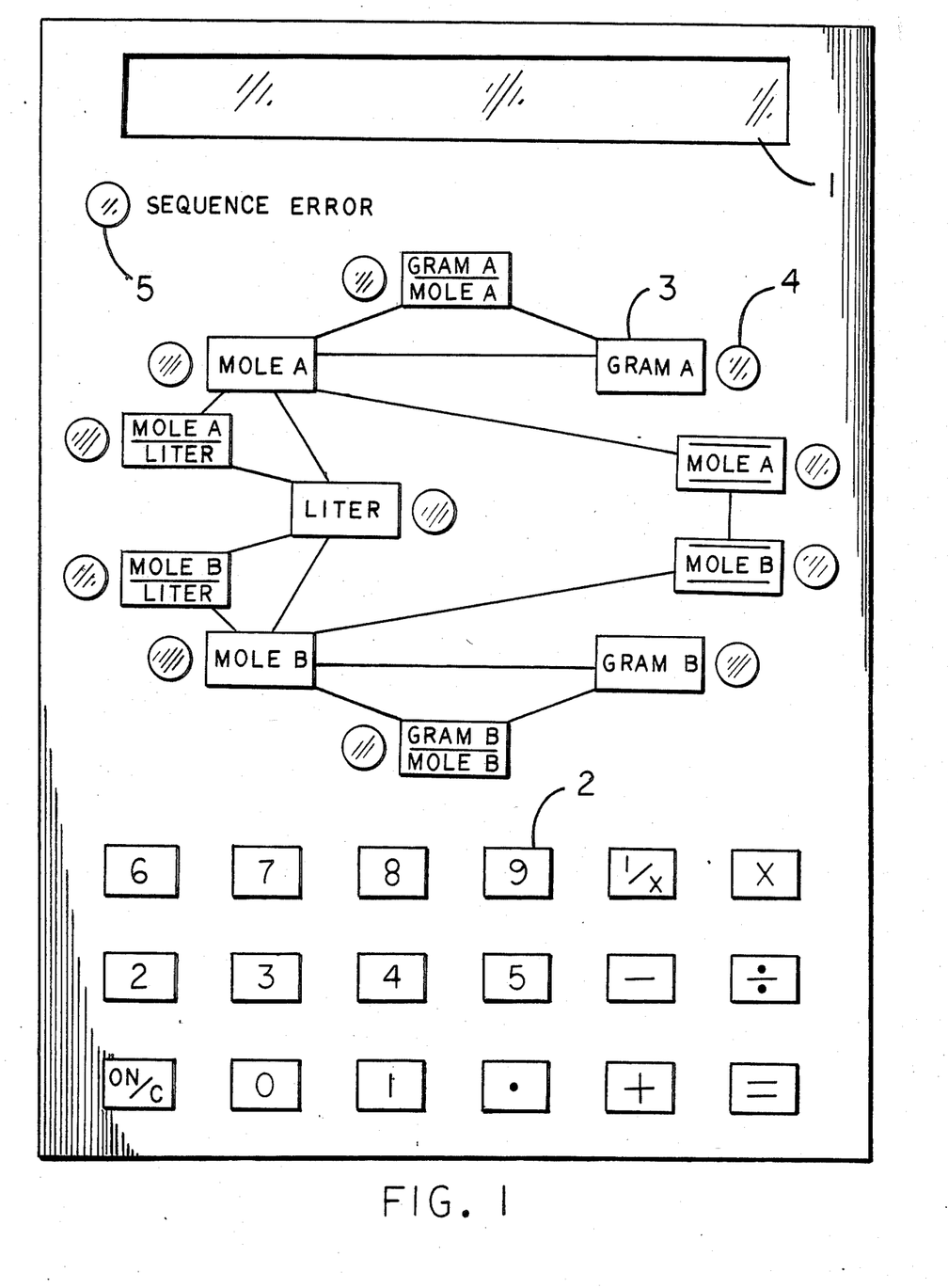
FIG. 1 is an external top plan view of the preferred embodiment of the invention, comprising an electronic calculator of conventional design with the exception of the upper portion of the keyboard, push-button input keys in said upper portion of the keyboard being labeled by chemical unit, and said unit-labeled input keys being apportioned to four triads and one tetrad by line segments on said keyboard, and each of said unit-labeled input keys being juxtaposed to a miniature LED indicator light.

The embodiment shown in FIG. 1 includes means for numerical display 1 and, in the lower section of the keyboard, conventional push-button input keys 2 labeled by numerical value, arithmetic operation, or calculator function, said keys being used in the usual manner to enter numerical values, or to implement the indicated arithmetic operation or calculator function. The remaining components shown in the figure area unique to the current invention.

The upper section of the keyboard contains push-button input keys 3 labeled by chemical unit, each of the said unit-labeled input keys being juxtaposed to a miniature LED indicator light 4. Said unit-labeled input keys are apportioned to five functional groups by line segments on the keyboard, said groups being later referred to as follows: the "highest triad" comprises the input keys labeled "MOLE A", "GRAM A/MOLE A", and GRAM A"; the "upper left triad" comprises the input keys labeled "MOLE A", "LITER", and "MOLE A/LITER"; the "lower left triad" comprises the input keys labeled "LITER", "MOLE B/LITER"; and "MOLE B"; the "lowest triad" comprises the input keys labeled "MOLE B", "GRAM B/MOLEB", and "GRAM B"; and the "tetrad" comprises the input keys labeled "MOLE A", "MOLE A", "MOLE B", and "MOLE B". The user will utilize any pair of input keys in one of the triads, or three consecutive input keys in the tetrad, followed by the "EQUALS" key in the lower section of the keyboard, to perform a one-step stoichiometric conversion. By continuing from one of the functional groups to another, said continuation being possible only at the input keys labeled "MOLE A", "MOLE B", or "LITER", a sequence of conversion steps can be performed, it being required that each subsequently depressed unit-labeled input key be directly joined by one of the line segments on the keyboard to the previously actuated unit-labeled input key, said previously actuated input key generally being juxtaposed to the sole illuminated LED. The following examples illustrate the interaction between the user and the calculator in solving problems in chemical stoichiometry. The calculator solutions to the examples are given in tabular form, in said tables the LED's adjacent to unit-labeled input keys as given below, being referred to by number as follows:
1 by "GRAM A"; 2 by "GRAM A/MOLE A"; 3 by "MOLE A"; 4 by "MO(LE A/LITER";
5 by "LITER"; 6 by "MOLE B/LITER"; 7 by "MOLE B"; 8 by "GRAM B/MOLEB";
9 by "GRAM B"; 10 by "MOLE A"; 11 by "MOLE B"

EXAMPLE 1

How many grams of sodium (symbol Na; atomic weight=23.0) are there in 0.435 moles of sodium sulfate (formula $Na_2SO_4$)? Generally working from the given information for "substance A" to the answer for "substance B", let $Na_2SO_4$="substance A" and Na="substance B"

| User Input: | LED Illuminated: | LED's Extinguished: | Numerical Display: |
|---|---|---|---|
| MOLE A | 3 | none | 0 |
| 0.435 | none | none | 0.435 |
| MOLE A | 10 | none | 0 |
| 1 | none | none | 1 |
| MOLE B | 11 | none | 0 |
| 2 | none | none | 2 |
| EQUALS | 7 | 3, 10, 11 | 0.87 |
| GRAM B/MOLE B | 8 | none | 0 |
| 23.0 | none | none | 23.0 |
| EQUALS | 9 | 7, 8 | 20.01 |

EXAMPLE 2

Given the reaction: $N_2+3H_2=2NH_3$ how many grams of $N_2$ (symbol N; atomic weight=14.0) must react to form 0.325 moles of $NH_3$?

Let $NH_3$="substance A" and $N_2$="substance B"

| User Input: | LED Illuminated: | LED's Extinguished: | Numerical Display: |
|---|---|---|---|
| MOLE A | 3 | none | 0 |
| 0.325 | none | none | 0.325 |
| MOLE A | 10 | none | 0 |
| 2 | none | none | 2 |
| MOLE B | 11 | none | 0 |
| 1 | none | none | 1 |
| EQUALS | 7 | 3, 10, 11 | 0.1625 |
| GRAM B/MOLE B | 8 | none | 0 |
| 28.0 | none | none | 28.0 |
| EQUALS | 9 | 7, 8 | 4.55 |

EXAMPLE 3

Given the following chemical reaction
2Hhd    $3PO_4(aq)+3Ba(OH)_2(aq)=Ba_3(PO_4)_2(s)+6-H_2O(l)$ what volume of 0.280M $H_3PO_4$ would be needed to react with 0.375 liters of 0.180M $Ba(OH)_2(aq)$?

Let $Ba(OH)_2$="substance A" and $H_3PO_4$="substance B"

| User Input: | LED Illuminated: | LED's Extinguished: | Numerical Display: |
|---|---|---|---|
| LITER | 5 | none | 0 |
| 0.375 | none | none | 0.375 |
| MOLE A/LITER | 4 | none | 0 |
| 0.180 | none | none | 0.180 |
| EQUALS | 3 | 5, 4 | 0.0675 |
| MOLE A | 10 | none | 0 |
| 3 | none | none | 3 |
| MOLE B | 11 | none | 0 |
| 2 | none | none | 2 |
| EQUALS | 7 | 3, 10, 11 | 0.045 |
| MOLE B/LITER | 6 | none | 0 |
| 0.280 | none | none | 0.280 |
| EQUALS | 5 | 7, 6 | 0.1607142 |

The solution reported by the user would be 0.161 liters.

As illustrated by user input in the examples, the user must follow the line segments on the keyboard in performing a sequence of one-step conversions. The upper section of the keyboard in FIG. 1 includes a miniature LED indicator light 5, illumination of which signals that an error has been made in the sequence of usage of the unit-labeled input keys.

Figure 2:
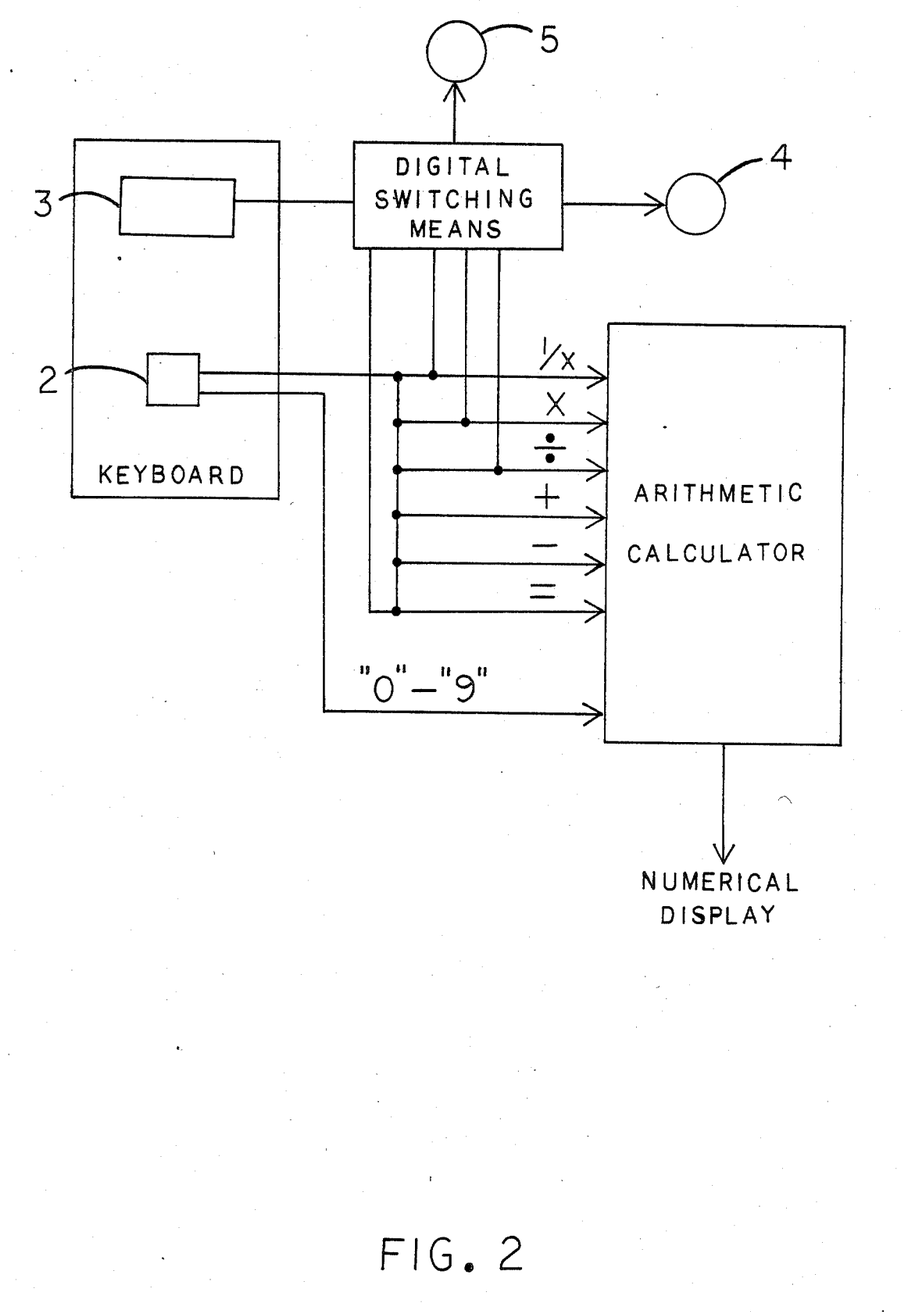
FIG. 2 is a schematic functional plan for input keys in the lower and upper sections of the keyboard shown in FIG. 1.
Figure 3A:
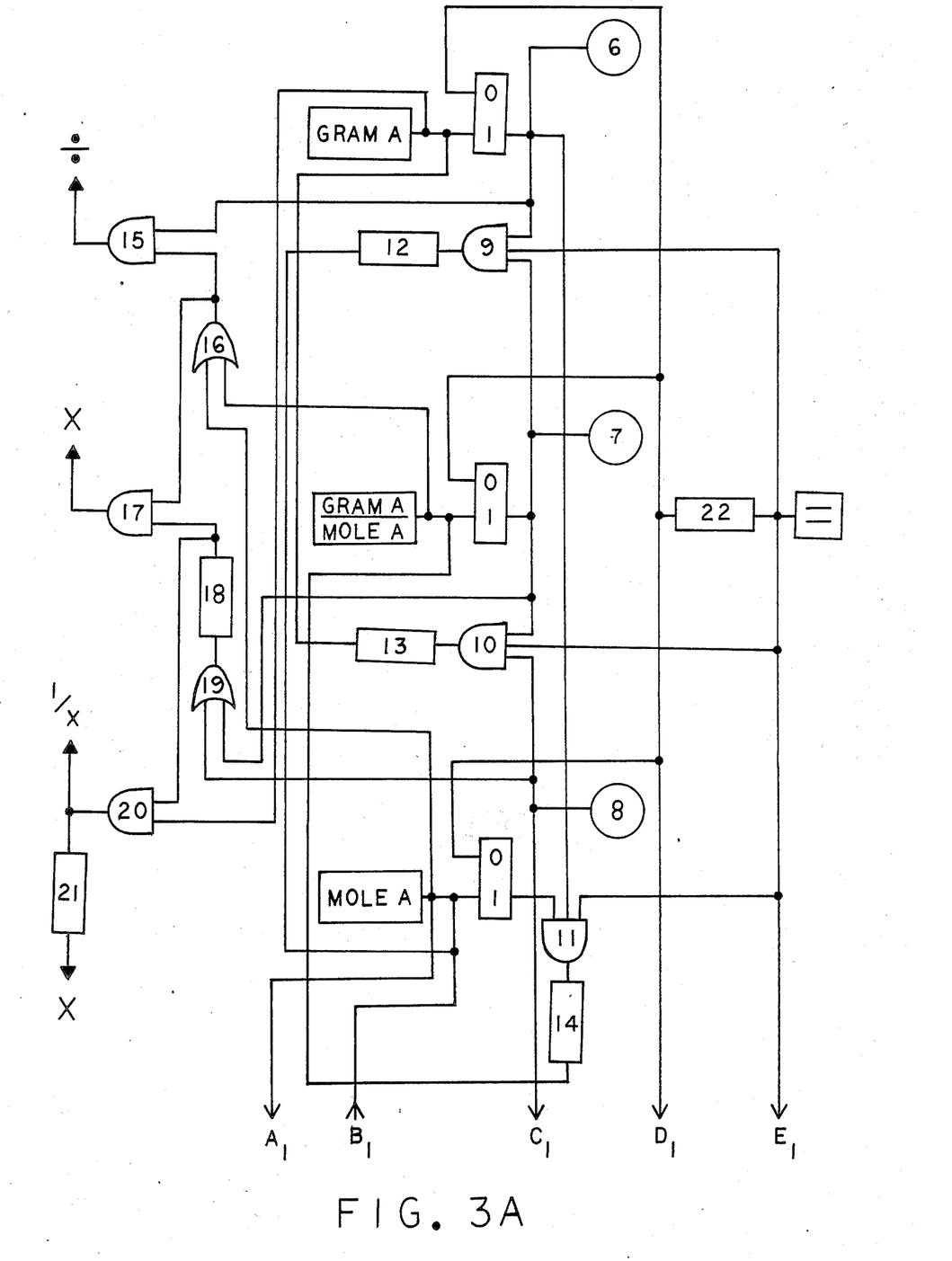
FIGS. 3A through 3D constitute a logic diagram implementing the functions of the unit-labeled input keys in the four triads.
Figure 3B:
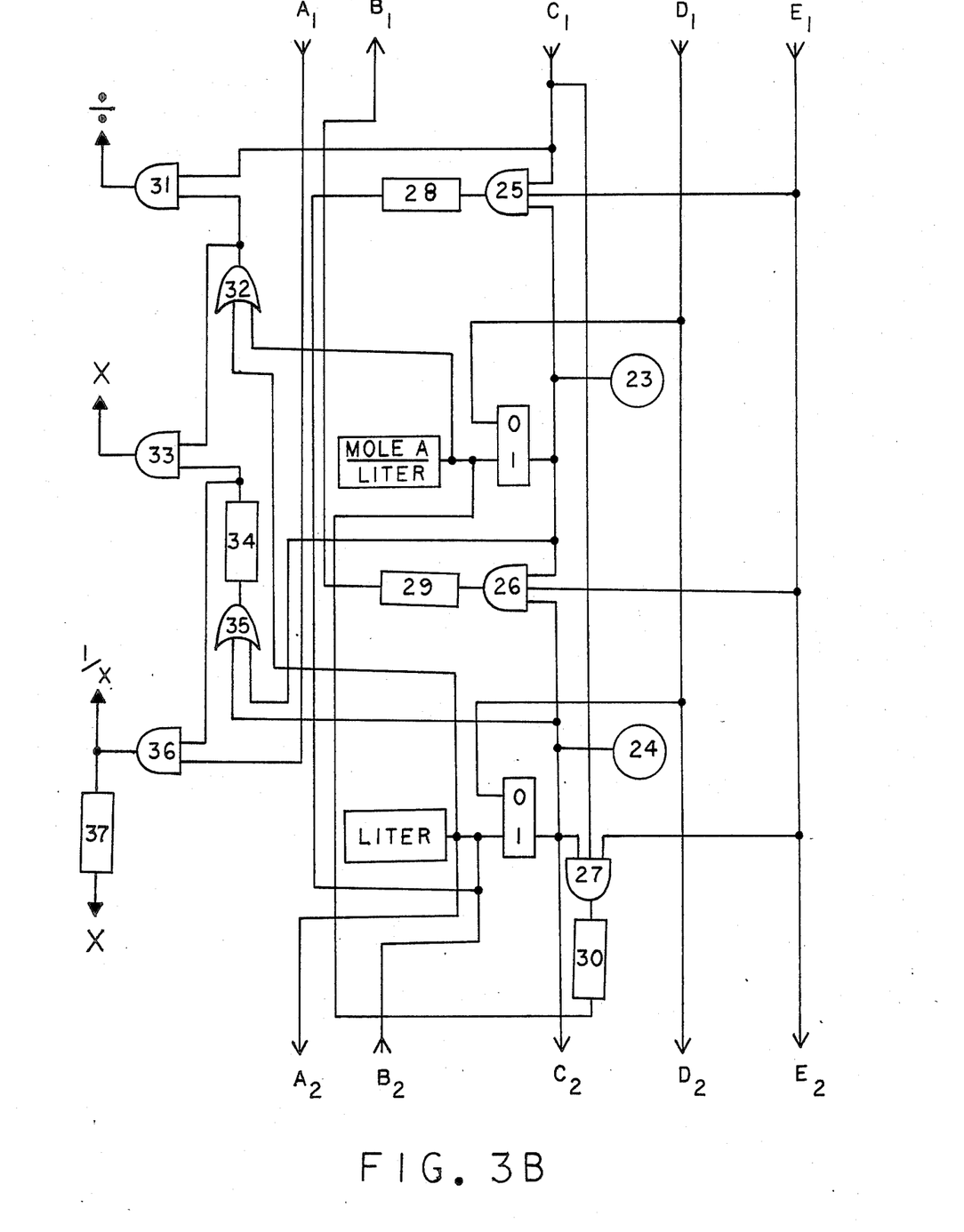
Figure 3C:
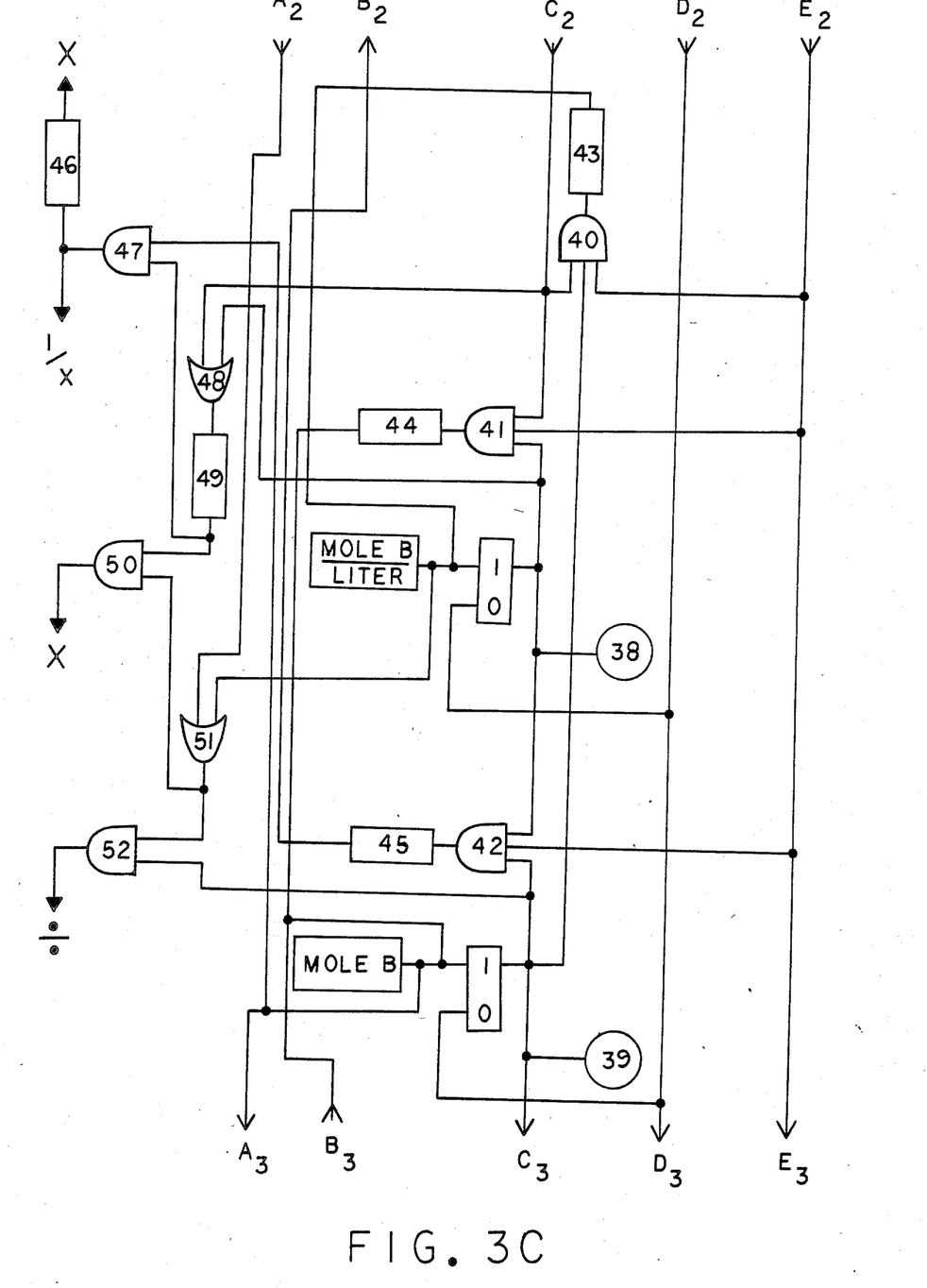
Figure 3D:
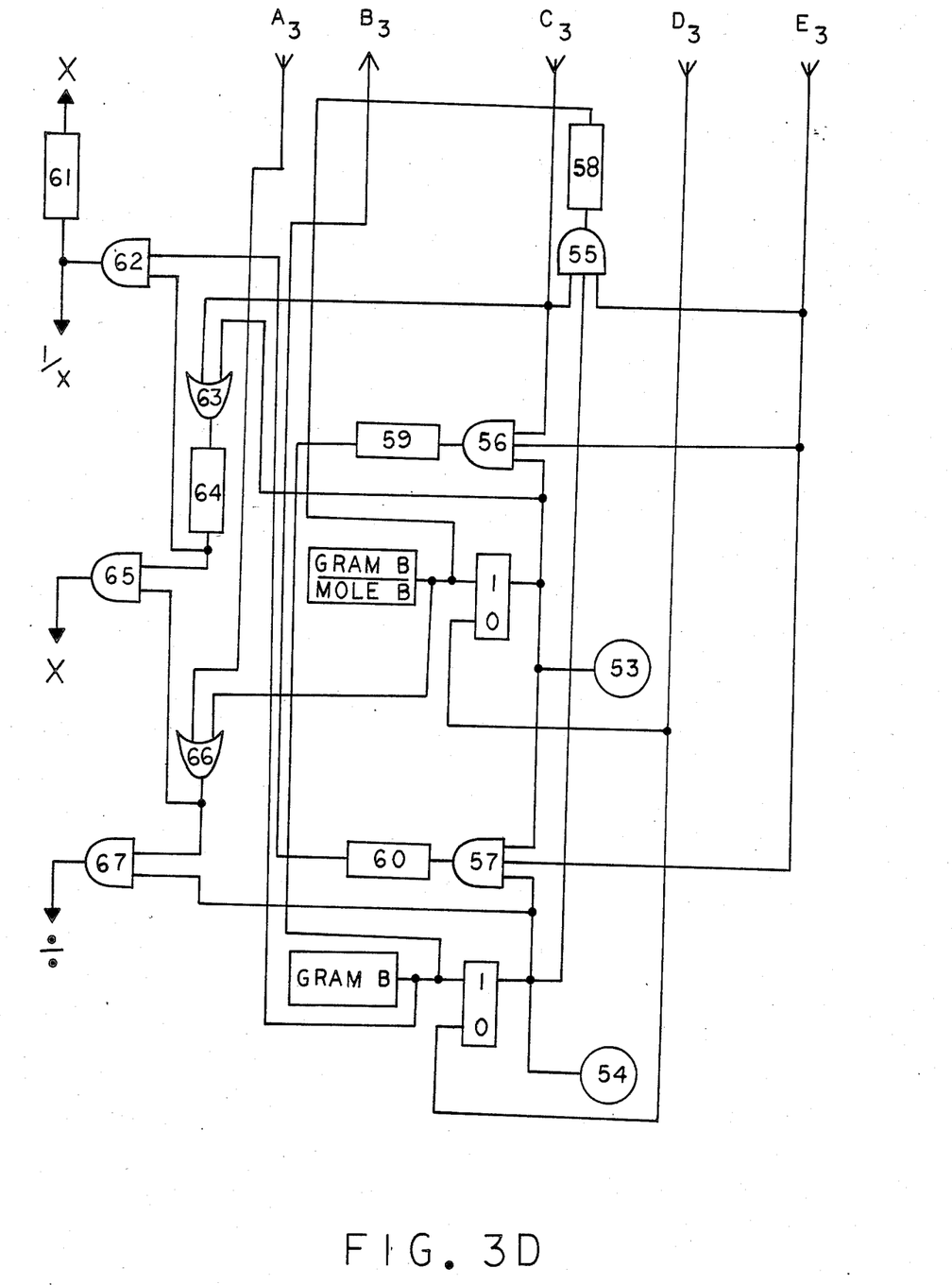

FIG. 2 schematically shows the functional plan for the input keys in the lower and the upper sections of the keyboard shown in FIG. 1. Input keys in the lower section of the keyboard function in the conventional manner to enter numerical values into the calculator, or to implement the indicated arithmetic operations on or with said numerical values, said enterred numerical values, or the results of said arithmetic operations, being given in the numerical display. The input keys in the upper section of the keyboard, unique to the current invention, are bifunctional, the first of said functions being to direct the appropriate arithmetic operation (said operations comprising inversion, multiplication, or division) to effect a given stoichiometric conversion; and the second of said functions being to effect illumination of appropriate LED indicator lights, thereby providing implicit unit display for values appearing in the numerical display said first and said second functions being implemented by appropriate digital electronic switching means.

FIGS. 3A through 3D constitute a logic diagram by which the dual functions of the unit-labeled input keys in the triads could be impelemented, said logic diagram including the following components: appropriate unit-labeled input keys and the "EQUALS" input key; miniature LED indicator lights, one of said lights being juxtaposed to each of said unit-labeled input keys; conventional "AND" and "OR" gates, and "RS flip-flops"; and signal delay components, said components numbered 18, 22; 34; 49; and 64 providing a delay of one unit of time between input and output, and said components numbered 12, 13, 14, 21; 28, 29, 30, 37; 43, 44, 45, 46; and 58, 59, 60, and 61 providing a delay of two units of time between input and output.

In any triad, there are six possible one-step unit conversions utilizing any sequence of two unit-labeled input keys. Said sequence of two unit-labeled input keys must direct an arithmetic operation which combines the units of the two said keys in a way that gives the unit of the third, unused input key of the triad. The two-key sequences in the triads, and the arithmetic operation that should be directed by each sequence, are given in the table below, in which the unit-labeled input keys in the triads are referred to by number as follows:

| 1 = GRAM A | 2 = GRAM A/MOLE A |
|---|---|
| 3 = MOLE A | 4 = MOLE A/LITER |
| 5 = LITER | 6 = MOLE B/LITER |
| 7 = MOLE B | 8 = GRAM B/MOLE B |
| 9 = GRAM B | |

| First Key No. | Second Key No. | | | | | | | | |
|---|---|---|---|---|---|---|---|---|---|
| | 1 | 2 | 3 | 4 | 5 | 6 | 7 | 8 | 9 |
| 1 | | ÷ | ÷ | | | | | | |
| 2 | 1/x.X | | X | | | | | | |
| 3 | 1/x.X | X | | ÷ | ÷ | | | | |
| 4 | | | 1/x.X | | X | | | | |
| 5 | | | 1/x.X | X | | X | 1/x.X | | |
| 6 | | | | | X | | 1/x.X | | |
| 7 | | | | | ÷ | ÷ | | X | 1/x.X |
| 8 | | | | | | | X | | 1/x.X |
| 9 | | | | | | | | ÷ | ÷ |

As shown by this table, the arithmetic operations to effect the necessary unit conversions are multiplication, division, or inversion followed by multiplication.

These arithmetic operations are implemented by output signals from appropriate "AND" gates in the logic diagram, said output signals being equivalent to those signals produced by manual depression of the so-called input key in the lower section of the keyboard: the "AND" gates 17, 33, 50, and 65 produce output signals equivalent to manual depression of the multiplication input key; the "AND" gates 15, 31, 52, and 67 produce output signals equivalent to manual depression of the division input key; and "AND" gates 20, 36, 47, 62 produce output signals equivalent to manual depression of the inversion and multiplication signals to follow the inversion signals by two units of time. Output from the said arithmetic "AND" gates is effected only when the gate receives steady input by virtue of actuation of a given first unit-labeled input key, followed by pulse input by virtue of actuation of a given second unit-labeled input key. The two-key sequences of unit-labeled input keys in the triads, and the arithmetic "AND" gate actuated by each sequence, are given in the table below, in which the unit-labeled keys themselves are referred to by number again as follows:

| 1 = GRAM A | 2 = GRAM A/MOLE A |
|---|---|
| 3 = MOLE A | 4 = MOLE A/LITER |
| 5 = LITER | 6 = MOLE B/LITER |
| 7 = MOLE B | 8 = GRAM B/MOLE B |
| 9 = GRAM B | |

| First Key No. | Second Key No. | | | | | | | | |
|---|---|---|---|---|---|---|---|---|---|
| | 1 | 2 | 3 | 4 | 5 | 6 | 7 | 8 | 9 |
| 1 | | 15 | 15 | | | | | | |
| 2 | 20 | | 17 | | | | | | |
| 3 | 20 | 17 | | 31 | 31 | | | | |
| 4 | | | 36 | | 33 | | | | |
| 5 | | | 36 | 33 | | 50 | 47 | | |
| 6 | | | | | 50 | | 47 | | |
| 7 | | | | | 52 | 52 | | 65 | 62 |
| 8 | | | | | | | 65 | | 62 |
| 9 | | | | | | | 67 | 67 | |

Comparison of this table with the analogous previous table, said table showing the arithmetic operation that should be directed by each two-key sequence of unit-labeled input keys in the triads, confirms that the arithmetic operation implemented by each two-key sequence is the appropriate operation to effect the stoichiometric conversion.

The logic diagram in FIGS. 3A through 3D also shows how the triad input keys effect illumination of appropriate LED indicator lights, thereby providing implicit display of chemical units. In every case, manual depression of any of the unit-labeled input keys effects the "hi" output state of an RS flip-flop, thereby effecting illumination of the LED indicator light juxtaposed to the said unit-labeled input key, and also effecting steady signals to two "AND" gates in addition to the arithmetic "AND" gates. Manual depression of a second unit-labeled input key, said second input key being in one of the triads with the said first unit-labeled input key, effects illumination of the LED indicator light juxtaposed to said second unit-labeled input key, the previously illuminated LED, being juxtaposed to said first unit-labeled input key, remaining also illuminated. Further, said depression of a second unit-labeled input key effects a second steady input signal to one of the two "AND" gates receiving steady input by virtue of depression of the first unit-labeled input key. The output signal from the said "AND" gate receiving dual steady input is produced upon depression of the "EQUALS" input key, said output signal from said "AND" gate being delayed two units of time by delay component 12, 13, 14; 28, 29, 30; 43, 44, 45; 58, 59, 60. Additional pulses produced by depression of the "EQUALS" key are delayed one unit of time by delay component 22, subsequently resetting the RS flip-flops previously actuated by depression of unit-labeled input keys, thereby extinguishing the then illuminated LED indicator lights juxtaposed to said unit-labeled input keys. The output signal from the actuated "AND" gate, said signal having been delayed two units of time, then produces further signals and effects equivalent to those produced by manual depression of the third, unused unit-labeled input key of the triad, thereby effecting illumination of the LED indicator light juxtaposed to said third unit-labeled input key. If additional conversion steps will follow, said third unit-labeled input key must be either the key labeled "MOLE A", "MOLE B", or "LITER", comprising a pre-actuated first unit-labeled input key for the next step.

Figure 4:
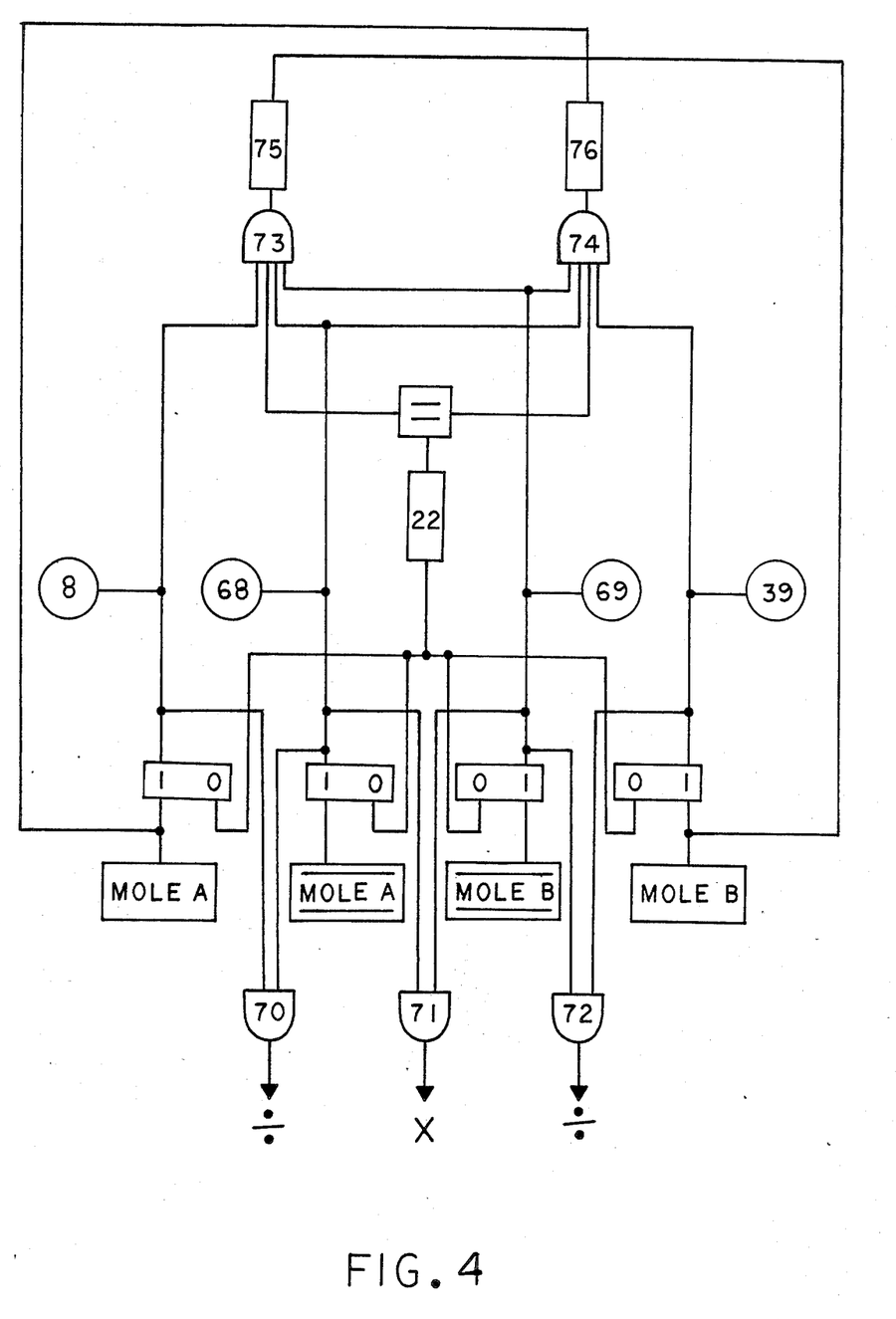
FIG. 4 is a logic diagram implementing the functions of the unit-labeled input keys in the tetrad.

FIG. 4 is a logic diagram showing how the dual functions of the unit-labeled input keys in the tetrad could be implemented. The logic diagram includes the following components: appropriate unit-labeled input keys and the "EQUALS" input key; miniature LED indicator lights, said lights being juxtaposed to said unit-labeled input keys; conventional "AND" gates and RS flip-flops; and delay components, said component 22 providing a delay of one unit of time, and said components 75 and 76 providing delay of two units of time, between input and output signals.

Unlike in the triads, in which any of three keys may be the first used, in the tetrad the first input key actuated must be either the key labeled "MOLE A" or the key labeled "MOLE B". The next two unit-labeled input keys must be used in order, followed by use of the "EQUALS" key. Actuation of the input key "MOLE A" following actuation of the key "MOLE A" produces the output signals from "AND" gate 70, said output signals from said "AND" gate being equivalent to those signals produced by manual depression of the division input key. Similarly, when actuation of the key "MOLE B" follows actuation of the key "MOLE B", output signals are produced at "AND" gate 72, said output signals being equivalent to depression of the division input key. Actuation of the next unit-labeled input key, "MOLE B" in the former case and "MOLE A" in the latter case, effects output signals from "AND" gate 71, said output signals being equivalent to those produced by manual depression of the multiplication input key. Starting at either "MOLE A" or "MOLE B", the starting unit is divided out and then multiplied by the final unit, as shown below:

MOLE A ÷ MOLE A × MOLE B = MOLE B

MOLE B ÷ MOLE B × MOLE A = MOLE A

As was true in the triads, manual depression of any of the unit-labeled input keys in the tetrad effects illumination of the LED indicator light juxaposed to said depressed input key. Actuation of the three input keys "MOLE A", "MOLE B" effects three steady input signals to "AND" gate 73; subsequent depression of the "EQUALS" input key effects a pulse input signal to said "AND" gate 73, thereby producing the output signal from said "AND" gate 73, said output signal being delayed two units of time by delay component 75. Additional pulses produced by depression of the "EQUALS" key are delayed one unit of time by delay component 22, subsequently resetting the RS flip-flops previously actuated by depression of unit-labeled input keys, thereby extinguishing the then illuminated LED indicator lights juxaposed to said unit-labeled input keys. The output signal from "AND" gate 73, said signal having been delayed two units of time, then produces further signals and effects equivalent to those produced by manual depression of the "MOLE B" input key. An analogous sequence of events occurs when the tetrad input keys are utilized in the reverse direction, an output signal from "AND" gate 74 being produced upon depression of the "EQUALS" input key, said output signal being delayed two units of time by delay component 76, and then finally producing further signals and effects equivalent to manual depression of the "MOLE A" input key.

Figure 5:
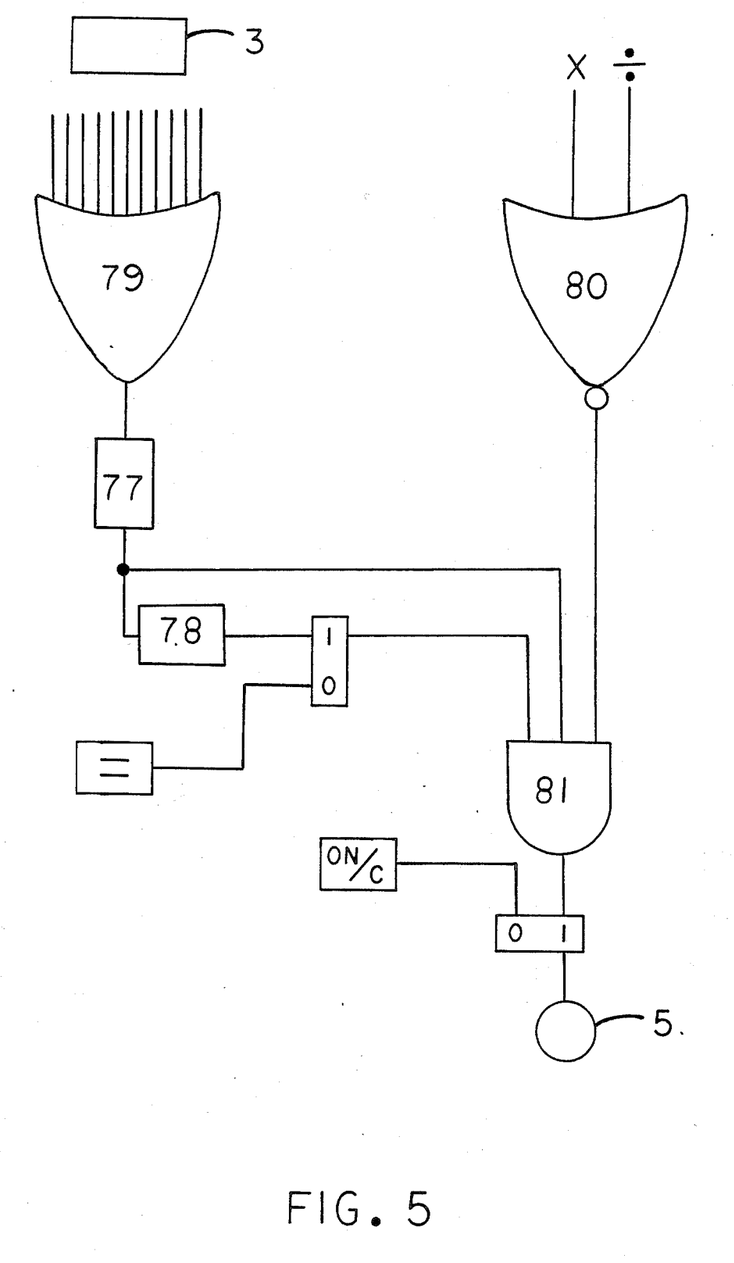
FIG. 5 is a logic diagram inplementing illumination of an LED sequence error indicator light.

FIG. 5 is a logic diagram showing how illumination of the sequence error LED indicator light could be implemented, said logic diagram including the following components: the unit-labeled input keys 3, the "EQUALS" input key, and the "ON/CLEAR" key; the sequence error LED indicator light 5; conventional "AND", "OR", and "NOR" gates; RS flip-flops; and delay components, said delay component 78 providing a delay of one unit of time between input and output, and said delay component 77 providing a delay of three units of time between input and output.

In the dimensional analysis approach to chemical stoichiometry, conversion factors must be utilized in a prescribed order for each problem. This requirement also applies to use of the unit-labeled input keys, sequence guidance being provided to the user by the line segments on the keyboard. Whenever a second unit-labeled input key is depressed, said second input key being joined by one of the line segments on the keyboard to an actuated first unit-labeled input key, in two units of time or less, signals will be produced which are equivalent to those produced by manual depression of either the multiplication input key or the division input key. If neither multiplication nor division signals are produced by depression of a second unit-labeled input key, then the said second unit-labeled input key can be concluded to be out of sequence, and "sequence error" should be signaled to the user.

In FIG. 5, actuation of any of the unit-labeled input keys 3 effects a pulse input to "OR" gate 79. The output pulse from said "OR" gate 79, after being delayed three units of time by delay component 77, provides an input pulse to "AND" gate 81, and, following a second delay of one more unit of time by delay component 78, actuates an RS flip-flop, thereby providing a delayed steady input signal to said "AND" gate 81. If a second unit-labeled input key 3 is actuated, a second input pulse is effected to "OR" gate 79, the output pulse from said "OR" gate again being delayed three units of time. If said second unit-labeled input key is in correct sequence with the first unit-labeled input key, either multiplication or division signals will be input to "NOR" gate 80, thereby terminating the signal from said "NOR" gate 80 to "AND" gate 81, said termination of input preventing the production of the output signal from said "AND" gate 81 upon arrival of the second signal from "OR" gate 79, said second signal having been delayed three units of time. With no output from "AND" gate 81, there is no illumination of the sequence error indicator light 5. If the said second unit-labeled input key is not in correct sequence with the first unit-labeled input key, multiplication or division signals will not be input to "NOR" gate 80. The output signal from "AND" gate 81 will be produced upon arrival of the second signal from "OR" gate 79, said output signal from said "AND" 81 actuating an RS flip-flop, thereby illuminating the sequence error LED indicator light 5, said actuated RS flip-flop being reset only by depression of the "ON/CLEAR" key, following which the user must re-start the solution, being careful to follow the line segments in using the unit-labeled input keys.

The objectives of the invention are met by the embodiment described herein. The chemical units most often needed for computation in chemical stoichiometry are provided by the unit-labeled input keys of said embodiment, said input keys greatly facilitating computation by automatically implementing appropriate arithmetic operations to effect step-wise stoichiometric conversions, and said embodiment providing unique guidance to the user in the sequence of said conversion steps. The direct use of chemical units in computation, and the display of said chemical units, make the device described herein uniquely compatible with "dimensional analysis" and uniquely useful for computation in chemical stoichiometry.

The disclosure of the current invention described herein, comprising the electronic calculator shown in the figures, represents an effective embodiment of the invention; however, variations, such as inclusion of input keys for additional operations or alternative forms for the logic diagrams, are possible without departing from the spirit and scope of the current invention as defined by the appended claims.

What is claimed is:

1. Electronics means to be incorporated into an electronic calculating device, said means facilitating computations in chemical stoichiometry with the said calculating device, said device including the following electronic components:
   arithmetic computing means for multiplying, dividing, and inverting numerical values;
   input switches causing said arithmetic operations to be performed by said computing means;
   manually actuated input switches for entering numerical values into the said computing means;
   display means for numerical values;
   a manually actuated "EQUALS" input switch; and
   electrical conductor means by which said components are interconnected;
   and said electronic means including the following electronic components:
   input switches provided in functional sets of three switches, two of three input switches in each of said functional sets being labeled by chemical units, and the third said input switch in each of said functional sets being labeled by a quotient of the units of the said other two input switches;
   input switches provided in a functional set of four switches, each of said input switches being labeled by an appropriate chemical unit;
   electronically actuated indicator means for each of said chemical units;
   electronically actuated "sequence error" indicator means;
   digital electronic switching means for storing input from said unit-labeled input switches, and for producing output actuating said indicator means for said chemical units and said "sequence error" indicator means, and further, causing said computing means to perform appropriate arithmetic operations; and
   electrical conductor means by which said components are interconnected, and connected to said components of said calculating device;
   said facilitation being effected by:
   actuation of a first unit-labeled input switch in a said functional set of three switches, said actuation causing said digital electronic switching means to actuate said indicator means for the unit of said first input switch, and preparing said digital electronic switching means for actuation of a second unit-labeled input switch in the said functional set; said actuation of said second unit-labeled input switch then causing said digital electronic switching means to actuate said indicator means for the unit of the said second input switch, and causing said arithmetic computing means to perform the appropriate arithmetic operation to effect conversion of the units of said first and said second unit-labeled input switches to the unit of the third unit-labeled input switch of the said functional set, and further, preparing said digital electronic switching means for actuation of the said "EQUALS" input switch; said actuation if said "EQUALS" input switch then terminating in said digital electronic switching means persisting electronic effects caused by actuation of said first and said second unit-labeled input switches, and subsequently, electronically producing effects in said digital electronic switching means equivalent to those that would be produced by manual actuation of the said third unit-labeled input switch of the said functional set, the said third unit-labeled input switch then comprising an electronically actuated first unit-labeled input switch for subsequent unit conversion.

2. Electronic means for facilitating computations as in claim 1, further effected by actuation of a first unit labeled input switch in said functional set of four switches, said actuation causing said digital electronic switching means to actuate said indicator means for the unit of said first input switch, and preparing said digital electronic switching means for actuation of a second unit-labeled input switch in said functional set; said actuation of said second unit-labeled input switch then causing said digital electronic switching means to actuate said indicator means for the unit of the said second input switch, and causing arithmetic division to be performed by said computing means, and further, preparing said digital electronic switching means for actuation of a third unit-labeled input switch in said functional set; said actuation of said third unit-labeled input switch then causing said digital electronic switching means to actuate said indicator means for the unit of the said third input switch, and causing arithmetic multiplication to be performed by said computing means, said division and multiplication effecting conversion of the unit of said first unit-labeled input switch to the unit of the fourth unit-labeled input switch of said functional set, and further, preparing said digital electronic switching means for actuation of the said "EQUALS" input switch; said actuation of said "EQUALS" input switch then terminating in said digital electronic switching means persisting electronic effects caused by actuation of said first, said second, and said third unit-labeled input switches, and subsequently, electronically producing effects in said digital electronic switching means equivalent to those that would be produced by manual actuation of the said fourth unit-labeled input switch of the said functional set, the said fourth unit labeled input switch then comprising an electronically actuated first unit-labeled input switch for subsequent unit conversion, 3. Electronic means for facilitating computation as in claim 2, further effected by actuation of a first unit-labeled input switch in a said functional set of three switches or in said functional set of four switches, followed by manual actuation of a second unit-labeled input switch not in said functional set, said actuation of said second unit-labeled input switch causing said digital electronic switching means to actuate said "sequence error" indicator means.

4. Electronic means to facilitate computations in chemical stoichiometry with an electronic calculating device as described in claim 3, wherein said electronically actuated indicator means for said chemical units comprise an LED juxtaposed to the label on said calculating device for each of said chemical units, and said "sequence error" indicator means comprises an LED juxtaposed to the label "SEQUENCE ERROR" on said calculating device.

5. Electronic means to facilitate computations in chemical stoichiometry with an electronic calculating device as described in claim 3, wherein the said unit-labeled input switches of said functional sets of three switches and said functional set of four switches comprise manually actuated push button keys, each of said keys being labeled with an appropriate chemical unit.

6. Electronic means to facilitate computations in chemical stoichiometry with an electronic calculating device as described in claim 3, wherein one of said functional sets of three switches comprises input switches labeled by the units "GRAM A", "MOLE A", and "GRAM A/MOLE A"; a second of said functional sets comprises input switches labeled by the units "MOLE A/LITER"; and "MOLE A/LITER"; a third of said functional sets comprises input switches labeled by the units "MOLE B", "LITER", and "MOLE B/LITER"; a fourth of said functional sets comprises input switches labeled by the units "MOLER B", "GRAM B", and "GRAM B/MOLE B"; and, said functional set of four switches comprises input switches labeled by the units "MOLE A", "MOLE A", "MOLE B", and "MOLE B".

* * * * *